US008375284B2

(12) United States Patent
Hirose et al.

(10) Patent No.: US 8,375,284 B2
(45) Date of Patent: Feb. 12, 2013

(54) DOCUMENT PROCESSING SYSTEM, INFORMATION PROCESSING UNIT, DISPLAY MEDIUM, COMPUTER READABLE MEDIUM, DOCUMENT PROCESSING METHOD, AND COMPUTER DATA SIGNAL

(75) Inventors: Yoshitsugu Hirose, Kanagawa (JP); Hiroyuki Hattori, Kanagawa (JP); Toshiroh Shimada, Kanagawa (JP); Tomoyuki Shoya, Kanagawa (JP); Shigehiko Sasaki, Kanagawa (JP); Minoru Koshimizu, Kanagawa (JP); Kiwame Tokai, Kanagawa (JP); Sho Hasegawa, Kanagawa (JP); Hiroshi Ishikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1076 days.

(21) Appl. No.: 11/497,371

(22) Filed: Aug. 2, 2006

(65) Prior Publication Data
US 2007/0174918 A1 Jul. 26, 2007

(30) Foreign Application Priority Data

Jan. 24, 2006 (JP) .................................. 2006-015035

(51) Int. Cl.
*H04N 7/16* (2006.01)
*G06F 17/30* (2006.01)
(52) U.S. Cl. ............................ 715/205; 715/234; 726/26
(58) Field of Classification Search .................... 726/26; 707/9; 715/255, 272, 277, 205, 234
See application file for complete search history.

(56) References Cited

U.S. PATENT DOCUMENTS

| | | | | |
|---|---|---|---|---|
| 5,495,581 | A * | 2/1996 | Tsai | 715/234 |
| 6,115,724 | A * | 9/2000 | Booker | 715/273 |
| 6,205,456 | B1 * | 3/2001 | Nakao | 715/201 |
| 6,396,598 | B1 * | 5/2002 | Kashiwagi et al. | 358/474 |

(Continued)

FOREIGN PATENT DOCUMENTS

| | | |
|---|---|---|
| JP | A-7-121529 | 5/1995 |
| JP | A-2002-117022 | 4/2002 |

(Continued)

OTHER PUBLICATIONS

Mar. 22, 2011 Office Action issued in Japanese Patent Application No. 2006-015035 (with translation).

(Continued)

*Primary Examiner* — Stephen S. Hong
*Assistant Examiner* — Marshon Robinson
(74) *Attorney, Agent, or Firm* — Oliff & Berridge, PLC

(57) ABSTRACT

A document processing system includes: a document management server that manages document data and an access key to access to the document data in association with each other; and an information processing unit including: a processing section; and a display detachably linked to the processing section by one of wired and wireless connection, the display holding an image of a document, the display storing the access key to access to the document data, the processing section comprising: a connection section to which the display is linked so as to read the access key from the display; a document acquisition section that acquires the document data corresponding to the access key read from the display from the document management server; and a document processing section that processes the document data acquired from the document management server.

20 Claims, 10 Drawing Sheets

U.S. PATENT DOCUMENTS

| | | | |
|---|---|---|---|
| 6,489,932 B1* | 12/2002 | Chitturi et al. | 345/30 |
| 6,771,381 B1* | 8/2004 | Klein | 358/1.15 |
| 7,350,076 B1* | 3/2008 | Young et al. | 713/169 |
| 7,432,899 B2* | 10/2008 | Johnson | 345/94 |
| 7,756,894 B2* | 7/2010 | Kurose | 707/781 |
| 2001/0000191 A1* | 4/2001 | Barkan et al. | 705/59 |
| 2001/0020238 A1* | 9/2001 | Tsuda | 707/5 |
| 2001/0046081 A1* | 11/2001 | Hayashi et al. | 359/296 |
| 2002/0052935 A1* | 5/2002 | Paxhia et al. | 709/220 |
| 2002/0055938 A1* | 5/2002 | Matsuo et al. | 707/104.1 |
| 2003/0071800 A1* | 4/2003 | Vincent et al. | 345/204 |
| 2003/0137496 A1* | 7/2003 | Stevens et al. | 345/173 |
| 2003/0212958 A1* | 11/2003 | Altman et al. | 715/517 |
| 2003/0226113 A1* | 12/2003 | Altman et al. | 715/520 |
| 2004/0044682 A1* | 3/2004 | Nakamura et al. | 707/102 |
| 2004/0070633 A1* | 4/2004 | Nakamura et al. | 345/860 |
| 2004/0155833 A1* | 8/2004 | Ishii et al. | 345/1.1 |
| 2004/0189672 A1 | 9/2004 | Yamazaki et al. | |
| 2005/0114882 A1 | 5/2005 | Sakamaki et al. | |
| 2005/0246621 A1* | 11/2005 | Ogawa et al. | 715/500 |
| 2005/0283472 A1 | 12/2005 | Hayashi et al. | |
| 2006/0017659 A1* | 1/2006 | Ogawa et al. | 345/30 |
| 2006/0031211 A1* | 2/2006 | Mizuno | 707/3 |
| 2006/0206717 A1* | 9/2006 | Holt et al. | 713/182 |
| 2006/0282903 A1* | 12/2006 | Jung et al. | 726/27 |
| 2007/0061311 A1* | 3/2007 | Kurose | 707/3 |
| 2007/0143618 A1* | 6/2007 | Sperry | 713/176 |
| 2007/0271508 A1* | 11/2007 | Audet | 715/530 |
| 2009/0152024 A1 | 6/2009 | Yamazaki et al. | |

FOREIGN PATENT DOCUMENTS

| | | |
|---|---|---|
| JP | 2004-A-040702 | 2/2004 |
| JP | 2004-A-064744 | 2/2004 |
| JP | A-2004-64744 | 2/2004 |
| JP | A-2004-102729 | 4/2004 |
| JP | A-2004-145743 | 5/2004 |
| JP | A-2004-234050 | 8/2004 |
| JP | 2005-A-035095 | 2/2005 |
| JP | A-2005-35095 | 2/2005 |
| JP | A-2005-267204 | 9/2005 |
| JP | A-2006-4256 | 1/2006 |

OTHER PUBLICATIONS

Office Action issued on Jun. 14, 2011 in Japanese Patent Application No. 2006-015035 (with English Translation).

* cited by examiner

FIG. 4

| DOCUMENT ID | DOCUMENT DATA | OWNER USER ID |
|---|---|---|
| ⋮ | ⋮ | ⋮ |

FIG. 5

| DOCUMENT ID | READ USER ID |
|---|---|
| ⋮ | ⋮ |

FIG. 6

| DOCUMENT ID | USING DOCUMENT ID |
|---|---|
| ⋮ | ⋮ |

DOCUMENT PROCESSING SYSTEM, INFORMATION PROCESSING UNIT, DISPLAY MEDIUM, COMPUTER READABLE MEDIUM, DOCUMENT PROCESSING METHOD, AND COMPUTER DATA SIGNAL

BACKGROUND

1. Technical Field

This invention relates to an art of controlling access to document data and in particular to an art of controlling access using electronic paper for holding display of a document image in a no-power supply state.

2. Related Art

Electronic data in various media such as an image and text is handled using a computer and a document is created, edited, read, etc.

To read such an electronic document, generally a document image is displayed on a display screen of a computer, or a document image is printed on paper of a paper medium using a printer.

In recent years, paper-like flexible thin electronic paper capable of holding display of an image in a no-power supply state has been developed as a document read medium that can replace paper.

The electronic paper is a device having a display for holding display of an information image in a no-power supply state and is roughly classified into self-write type electronic paper having a function of writing an image to the display for itself based on electronic data and transfer write type electronic paper for holding an image written by projection transfer, thermal transfer, etc., on the display according to the write manner of an information image to the display.

Unlike paper, such electronic paper enable to erase or overwrite the image whose display is held on the display and can be used repeatedly and therefore it is also desirable to promote the user of the electronic paper from the viewpoint of paper resource savings, etc.

Generally, document data is stored in storage of a database, etc., for management and the storage inhibits any other user from accessing document data without permission of the owner user.

Therefore, for any other user to access any desired document data, he or she needs to obtain permission of access from the owner user of the document data.

To permit a different user to access the document data, the owner user of the document data gives identification information of the document data, identification information of the different user, information of permitted processing description (read, edit, etc.,) to the storage for setting the access right by manual input using an input machine of a keyboard, a mouse, etc., and this work is cumbersome for the owner user. Setting the access right by manual input causes a setting mistake of granting the access right to document data different from the intended document data or granting the access right to a user different from the intended user, for example.

It is therefore an object of the invention to make it possible to grant the access right to document data easily and as intended by using electronic paper.

SUMMARY

According to an aspect of the invention, a document processing system includes: a document management server that manages document data and an access key to access to the document data in association with each other; and an information processing unit including: a processing section; and a display detachably linked to the processing section by one of wired and wireless connection, the display holding an image of a document, the display storing the access key to access to the document data. The processing section includes: a connection section to which the display is linked so as to read the access key from the display; a document acquisition section that acquires the document data corresponding to the access key read from the display from the document management server; and a document processing section that processes the document data acquired from the document management server.

That is, one user can pass the display to another facing each other, whereby the access right (access key) to the document data corresponding to the display image displayed on the display section can be granted, so that for example, the owner user can pass the display while visually checking the document image and the associated user, and can grant the access key as intended. The access key can be granted by an easy action of passing the display; this is convenient.

As the display section, it is desirable that a lightweight and inexpensive medium should be used so that it can be easy to carry and can be passed to another without reserve, such as electronic paper.

Although the document ID to identify document data, for example, can be used as the access key, it is desirable that permission information responsive to the permitted processing description (read, use of document data for any other document, edit, etc.,) should be used in combination with the document ID.

To use such permission information, the processing performed by the document processing means varies in response to the permission information. For example, for permission information to permit read, the document processing means performs processing of displaying the acquired document data on the display of the information processing unit or printing out the acquired document data on paper from a printer connected to the information processing unit. For example, for permission information to permit use of document data for any other document, the document processing means performs processing of including a part of the acquired document data in any other document data. For example, for permission information to permit edit, the document processing means performs processing of editing the acquired document data.

The invention is embodied in various forms not only of the system including the information processing unit and the document management server described above and a method executed by the system, but also of an information processing unit, a display medium forming a part of the information processing unit, and a program embodied in a computer readable medium for causing a computer to serve as a processing section of the information processing unit.

BRIEF DESCRIPTION OF THE DRAWINGS

Exemplary embodiment of the present invention will be described in detail based on the following figures, wherein:

FIG. 4 is a drawing that illustrates management data in a document management DB according to the exemplary embodiment of the invention;

FIG. 5 is a drawing that illustrates read logs in a log management DB according to the exemplary embodiment of the invention;

FIG. 6 is a drawing that illustrates use logs in the log management DB according to the exemplary embodiment of the invention;

DETAILED DESCRIPTION

Exemplary embodiments of the invention will be discussed.

Figure 1:
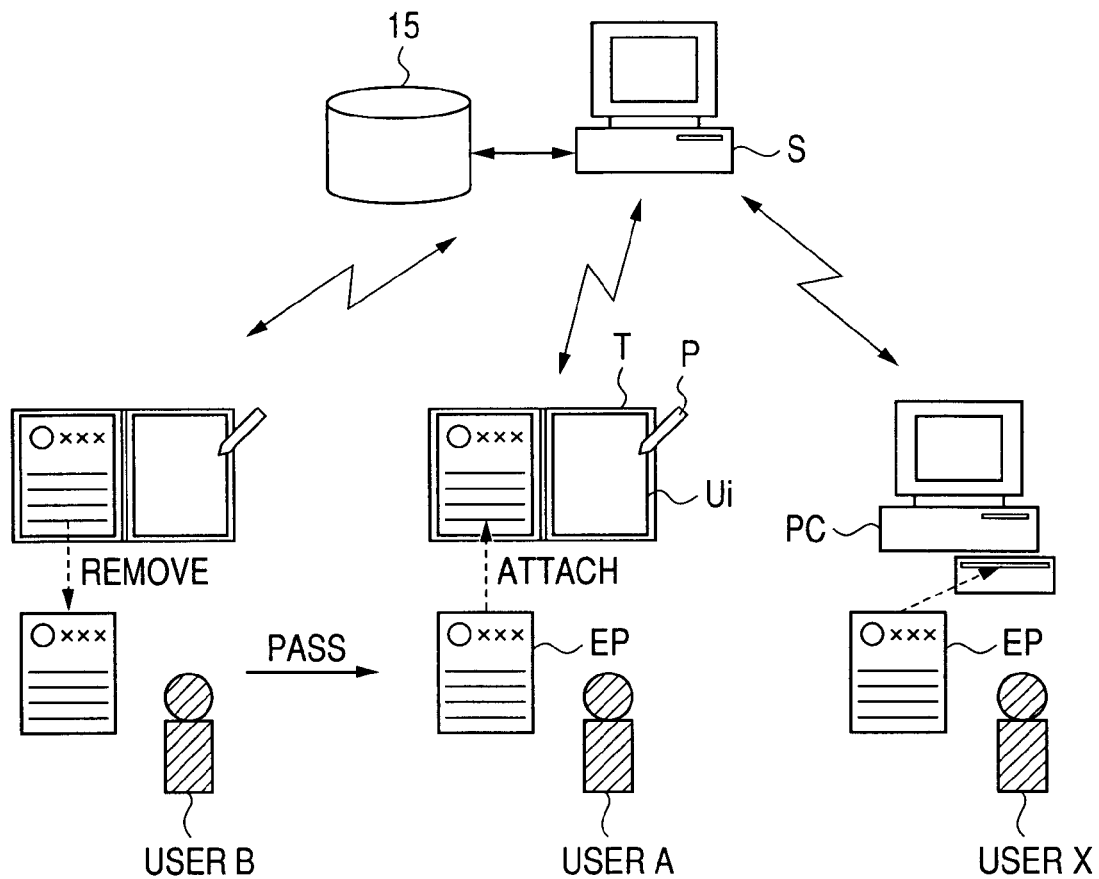
FIG. 1 is a drawing that illustrates an outline of a document processing system according to one exemplary embodiment of the invention.

FIG. 1 illustrates an outline of a document processing system according to one exemplary embodiment of the invention.

The document processing system of the exemplary embodiment contains a document management server S having a document management DB 15 for managing documents and plural information processing units T for conducting information communications with the document management server S. In the exemplary embodiment, wireless communications are conducted, but the units may be linked through a network line for conducting communications with each other.

Each of the information processing units T of the exemplary embodiment is a unit including a user interface UI for displaying various information images and detecting input with a pen P by a pressure sensitive sensor and performs various types of information processing in addition to providing the user with information and performing acceptance processing of information input from the user.

The information processing unit T includes a display (EP) detachably linked by wired or wireless connection. The display can be removed from the information processing unit T of user B and can be passed to user A, who can then attach the display to the information processing unit T of the user A, for example, as illustrated in the figure.

Figure 2:
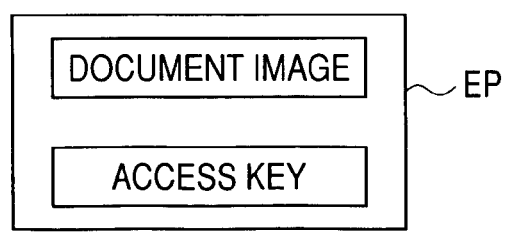
FIG. 2 is a drawing that illustrates information retained on electronic paper according to the invention.

In the exemplary embodiment, paper-like flexible thin electronic paper EP capable of holding display of an image in a no-power supply state is used as the display to hold display of a document image and store an access key used for accessing data of the document managed by the document management server S, as illustrate in FIG. 2.

That is, the electronic paper EP that can be detached from the information processing unit T is used as an access key delivering medium, whereby one user can pass the electronic paper EP to another facing each other and at the time, the user can visually check the document image displayed on the electronic paper EP and the associated user to whom the electronic paper EP is passed, so that the user can grant the access key reliably. The access key can be granted by an easy action of passing the electronic paper EP; this is convenient.

Figure 3:
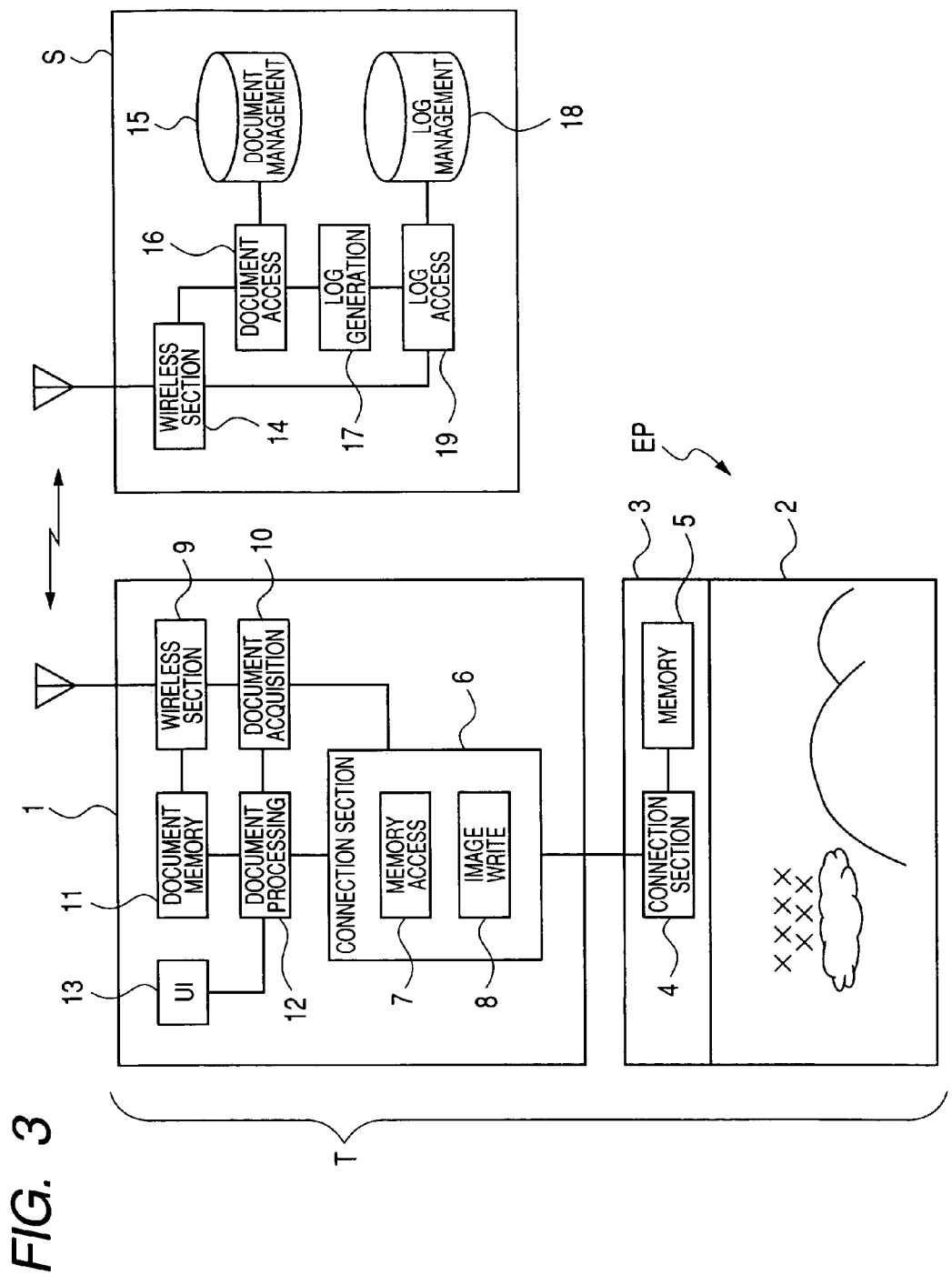
FIG. 3 is a drawing that illustrates the configuration of the document processing system according to the exemplary embodiment of the invention.

FIG. 3 illustrates the functions of the document management server S and the information processing unit T.

The information processing unit T includes a processing section 1 and a display (electronic paper) EP, wherein the electronic paper EP is detachably linked to the processing section 1 by wired or wireless connection.

The electronic paper EP has an image holding section 2 for holding display of an image in a no-power supply state and a data processing section 3 for performing processing of electronic data, and the data processing section 3 is provided with a connection section 4 for connecting to the processing section 1 and memory 5 for storing an access key.

The processing section 1 of the information processing unit T includes a connection section 6 to which electronic paper EP is linked, memory access section 7 serving as a connection section for accessing the memory 5 of the linked electronic paper EP, image write section 8 for writing an image to the image holding section 2 of the linked electronic paper EP, a wireless section 9 for conducting wireless communications with the document management server S, document acquisition section 10 for acquiring document data from the document management server S, document memory 11 for retaining the acquired document data, document processing section 12 for processing the document data, and a user interface 13 for providing the user with information and accepting input from the user.

The document management server S includes a wireless section 14 for conducting wireless communications with the information processing unit T, a document management DB 15 for managing document data and the access key to the document data in association with each other, document access section 16 for accessing the document management DB 15, log generation section 17 for generating an access log to the document data, a log management DB 18 for storing the generated access logs, and log access section 19 for accessing the log management DB 18.

In the exemplary embodiment, the document management DB 15 and the log management DB 18 are installed in the same server, but may be installed in separate servers in the system.

To begin with, the electronic paper EP used in the exemplary embodiment will be discussed.

The exemplary embodiment uses self-write type electronic paper EP for rewriting a display image under the control of the processing section 1 of the information processing unit T.

The self-write type electronic paper EP is a flexible thin medium of a size like a card stipulated in the JIS or A4 paper and the data processing section 3 is provided on a side of the image holding section 2 occupying the most area. The size of the image holding section 2 is set in response to the use. Known RFID including a wireless communication function of data and a data storage function in a comparatively simple configuration may be used as the memory 5 of the data processing section 3.

The processing section 1 of the information processing unit T retains the document data received through the wireless section 9 from the document management server S in the document memory 11, and the document processing section 12 generates image data based on the document data retained in the document memory 11 and gives the image data to the image write section 8. The image write section 8 has a driver for controlling electrodes provided in the image holding section 2 of the electronic paper EP and drives the driver with the electronic paper EP linked to the connection section 6 for writing and displaying an image to and on the image holding section 2 of the electronic paper EP based on the image data. The electronic paper EP has a function of continuing to hold an image on the image holding section 2 in a display state if the drive power of the driver is removed, and thus the electronic paper EP can hold display of the image if it is detached from the processing section 1.

Figure 10:
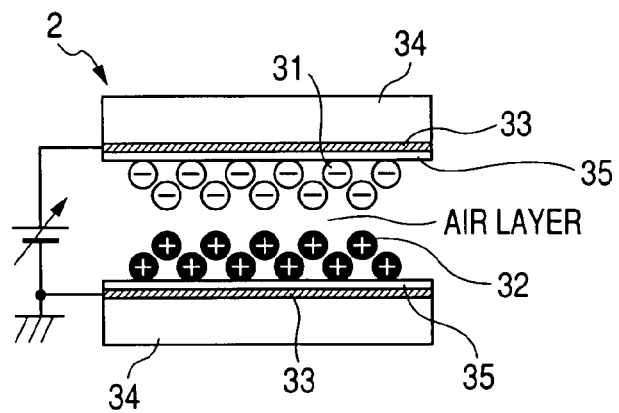
FIG. 10 is a drawing that illustrates the structure of self-write type electronic paper.

The electronic paper EP has a structure wherein fine colored particles used as toner with a copier (in the example illustrated in the figure, white particles 31 and black particles 32) are filled between a pair of surface and back electrodes 33 with at least the surface being transparent and they are sandwiched between a pair of surface and back film substrates 34 with at least the surface being transparent, as illustrated in FIG. 10 representing the cross-sectional structure of the image holding section 2. An air layer is provided between the electrode layers 33 so as to allow the colored particles 31 and 32 to move freely, and each matrix-like electrode layer 33 is provided with an insulating layer 35 for preventing the electrode layer from coming in contact with the colored particles 31 and 32. Using a color filter, color display can also be realized as a simple structure.

Figure 9:
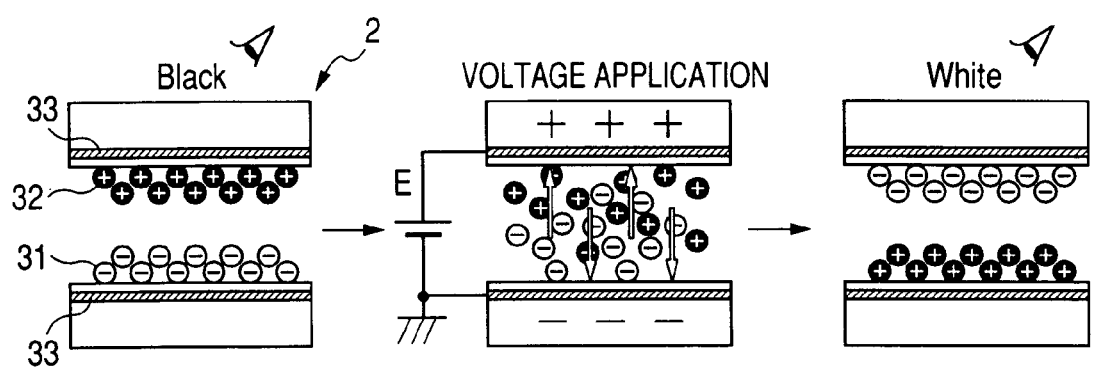
FIG. 9 is a drawing that illustrates the operation principle of self-write type electronic paper.

In the electronic paper EP, the negatively (minus) charged white particles 31 remain on the back and the positively (plus) charged black particles 32 remain on the surface in a state in which no voltage is applied to the electrode 33 (however, the electrode 33 is charged in the polarity at the previous drive time) and if the user visually observes the image holding section 2 from the surface, the image holding section 2 is placed in a black state, as illustrated in FIG. 9 representing the operation principle of the image holding section 2. When the driver operates based on the image data and the electrode polarity of the required part of the matrix responsive to the image to be displayed is inverted, the positional relationship between the white particles 31 and the black particles 32 is replaced and an image based on the contrast between the white particles 31 and the black particles 32 is displayed on the image holding section 2. The driver is operated based on different image data, whereby image information displayed on the image holding section 2 based on the contrast between the white particles 31 and the black particles 32 can be switched and the electronic paper EP can be reused repeatedly.

The information processing unit T of the exemplary embodiment writes a document image to the electronic paper EP by the image write section 8 for display of the document image on the electronic paper EP and writes and retains an access key for accessing the document data of the document to and in the memory 5 of the electronic paper EP by the memory access section 7.

The access key in the exemplary embodiment is made up of the document ID for identifying the document data and permission information indicating the processing description permitted for the document data, and either "1: Permission of read" or "2: Permission of use of document data for any other document (containing permission of read)" is set as the permission information. When the user interface 13 accepts command input of writing a document image to electronic paper EP from the user, which of the attributes is to be set is specified together with the document data to be written.

The electronic paper EP to which the document image and the access key to the data of the document are thus written is detached from the processing section 1 of the information processing unit T and is passed to another user to permit access to the document data. Therefore, one user can pass the electronic paper EP to another (associated user) while visually checking the document image displayed on the electronic paper EP and the associated user to whom the electronic paper EP is passed, so that mistakes of the associated user granted the access key and the document can be decreased.

The user receiving the electronic paper EP links the electronic paper EP to the processing section 1 of the information processing unit T owned by the user and accesses the corresponding document data.

When the electronic paper EP is linked to the information processing unit T the memory access section 7 reads the access key from the memory 5 of the electronic paper EP, and the document acquisition section 10 transmits the read access key to the document management server S for requesting the document management server S to send the corresponding document data.

The document management server S manages "document ID," "document data" identified by the document ID, and "owner user ID" for identifying the owner user of the document data in association with each other in the document management DB 15, as illustrated in FIG. 4.

The access key is made up of the document ID and permission information as described above and when the access key is received from the information processing unit T, the document access section 16 acquires the document data corresponding to the document ID of the access key from the document management DB 15 and returns the document data to the information processing unit T.

The information processing unit T stores the document data received from the document management server S in the document memory 11 and the document processing section 12 performs processing responsive to the permission information of the access key.

If the permission information is "1: Permission of read," the document processing section 12 displays the acquired document data on the user interface 13 or prints out the acquired document data on paper from a printer linked to the information processing unit T. That is, for example, if only one page is displayed on the image holding section 2 of the electronic paper EP although the document image contains two or more pages, the remaining pages are output, enabling the user to read the pages.

If the permission information is "2: Permission of use of document data for any other document (containing permission of read)," the document processing section 12 displays the acquired document data on the user interface 13 and performs processing of including a part or all of the document data in any other document data based on user operation. That is, efficient document creation can be accomplished using the already existing document data.

In the document management server S, the log generation section 17 generates a read log associating "document ID" and "read user ID" of the user reading the document data identified by the document ID with each other, as illustrated in FIG. 5, in response to access to the document data in the document management DB 15 based on the access key, and stores the read log in the log management DB 18.

That is, when the access key is transmitted to the document management server S, the document acquisition section 10 of the information processing unit T adds the user ID of the user operating the information processing unit T to the access key for transmission and as the document access section 16 transmits the document data corresponding to the document ID of the access key to the information processing unit T, the log generation section 17 generates a read log containing the document ID of the access key and the user ID added to the access key in association with each other and stores the read log in the log management DB 18. Although the user ID transmitted by the information processing unit T is preset in the information processing unit T in the exemplary embodiment, the user may be requested to enter the user ID at the start time, etc., of the information processing unit T. The document management server S may be provided with a unit management table associating the user ID and the unit ID for identifying the information processing unit T with each other and the information processing unit T may transmit the unit ID in place of the user ID to the document management server S, which may then convert the unit ID into the user ID.

The log management DB 18 in the exemplary embodiment stores a use log associating "document ID" and "using document ID" for identifying document data created using the document data identified by the document ID with each other as illustrated in FIG. 6.

The use log is generated as the document processing section 12 of the information processing unit T performs processing of including a part or all of any other document data in the using document data retained in the document memory 11 and the using document data is stored in the document management DB 15 of the document management server S. That is, to store document data in the document memory 11 in the document management DB 15, the information processing unit T transmits the document data, the document ID of the document data, and the user ID. At this time, the information processing unit T also transmits the document ID of different document data used for creating the document data, and the log generation section 17 generates a use log with the document ID of the different document data as "document ID" and the document ID of the document data stored in the document management DB 15 as "using document ID" and stores the use log in the log management DB 18.

Figure 7:
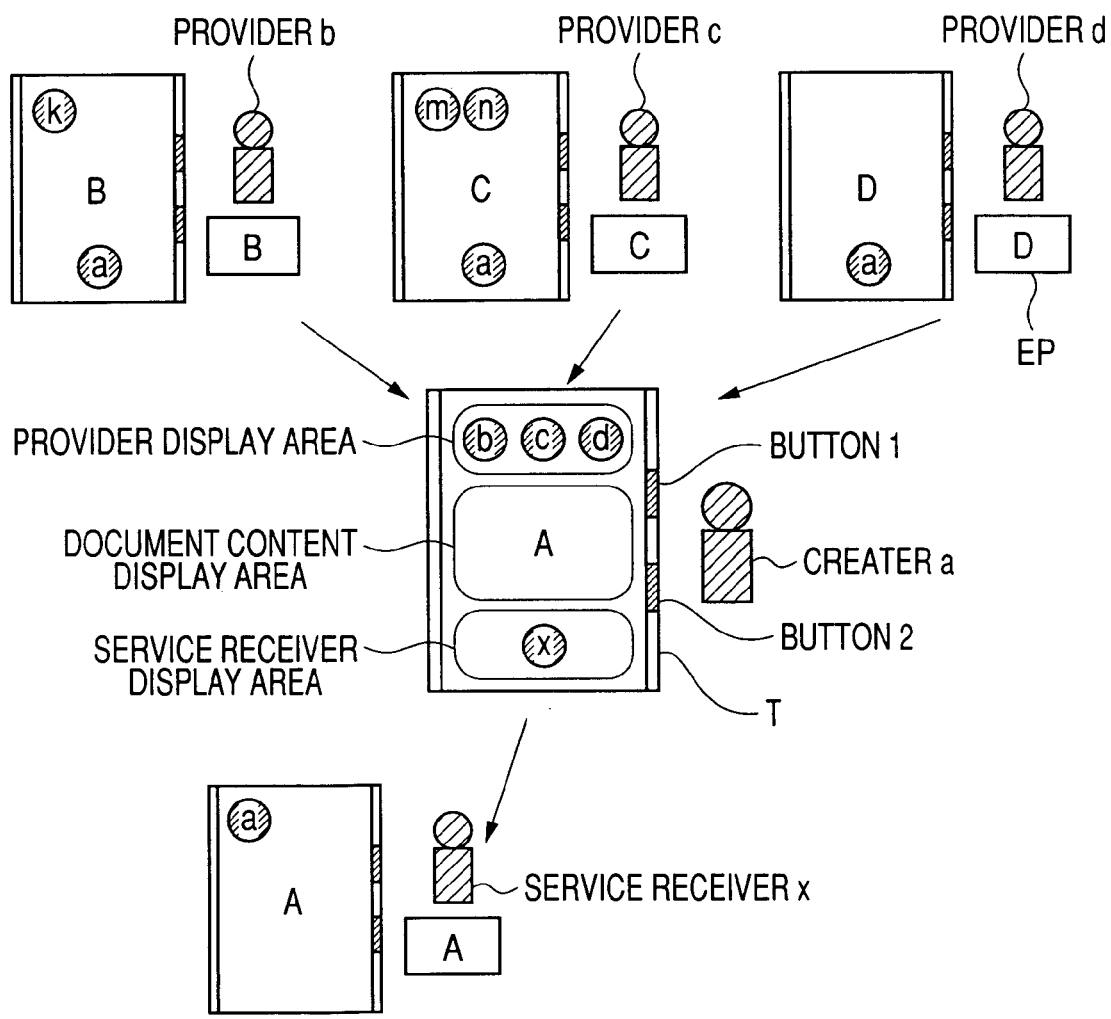
FIG. 7 is a drawing that illustrates an example of the relationship among pieces of document data according to the exemplary embodiment of the invention.

The read log and the use log stored as described above can be used to keep track of the read state and the use state of the document data. FIG. 7 illustrates a use example.

The figure represents a situation in which document A created by creator a is created using document B provided by provider b, document C provided by provider c, and document D provided by provider d and is read by service receiver x.

The UI (user interface) of the information processing unit T owned by each user is provided with a document content display area for displaying the contents of document data in the center, a provider display area for displaying the providers of different document data used for creating the document data in the upper part, and a service receiver display area for displaying the service receiver reading or using the document data in the lower part, enabling the user to keep track of the document data contents, the providers, and the service receiver (user, reader) at a glance.

The user can switch the service receiver display as desired between display of either the user or the reader and display of both the user and the reader in the service receiver display area.

According to the example illustrated in the figure, on the UI of the information processing unit T owned by the document creator a, the document A is displayed in the document content display area, the providers b, c, and d of the document data used for creating the document A are displayed in the provider display area, and the reader x reading the document A is displayed in the service receiver display area. The document B, provider k of document data used for creating the document B, and user a using the document B are displayed on the UI of the information processing unit T owned by the provider b. The document C, providers m and n of document data used for creating the document C, and the user a using the document C are displayed on the UI of the information processing unit T owned by the provider c. The document D and the user a using the document D are displayed on the UI of the information processing unit T owned by the provider d. The document A and provider a of the document A are displayed on the UI of the information processing unit T owned by the service receiver x.

The providers and the service receivers (users, readers) displayed on the UI of the information processing unit T are determined using the read logs and the use logs stored in the log management DB 18 as follows:

To determine the provider, "document ID" is acquired from the use log in which the document ID of the document data displayed in the document content display area is recorded as "using document ID" and the document management DB 15 is referenced for acquiring the "owner user ID" corresponding to the document data.

To determine the user, "using document ID" is acquired from the use log in which the document ID of the document data displayed in the document content display area is recorded as "document ID" and the document management DB 15 is referenced for acquiring the "owner user ID" corresponding to the using document data.

To determine the reader, "read user ID" is acquired from the read log in which the document ID of the document data displayed in the document content display area is recorded as "document ID."

Display of the provider and the service receiver (user, reader) may be updated in real time in response to new storage of the corresponding read log and use log as the log management DB 18 is monitored or may be updated in response to a user's request.

The UI of the information processing unit T is provided with buttons 1 and 2 at the right end.

The button 1 is a button for displaying a document relevant to the display document. When the user operates the button 1, the relationship between the display document and the relevant document is displayed in the document content display area as an image.

That is, as the button 1 is operated, the use logs in the log management DB 18 are referenced and "using document ID" of the use log in which the document ID of the displayed document data is recorded as "document ID" and "document ID" of the use log in which the document ID of the displayed document data is recorded as "using document ID" are acquired, whereby the relevant document is determined and a relation image is generated and displayed. A relation image not only with the relevant document one generation away from the display document as mentioned above, but also with a relevant document two generations or more away from the display document may be displayed.

Such a relation image with the relevant document may be used as an image of a document displayed on electronic paper EP and it is made possible for the user receiving electronic paper EP to know the presence of any other document as reference simply by seeing the electronic paper EP.

The button 2 is a button for displaying an edit history of a display document. When the user operates the button 2, the history of the edits made on the display document is displayed in the document content display area.

That is, the document processing system is provided with a history management server for retaining as a history the contained document data part and the document ID of the contained used document data as a part or all of document data is included in different document data. As the user operates the button 2, the history corresponding to the display document is acquired from the history management server and the used document ID, the owner user ID, and the like are displayed in the corresponding part of the display document in association with each other.

Figure 8:
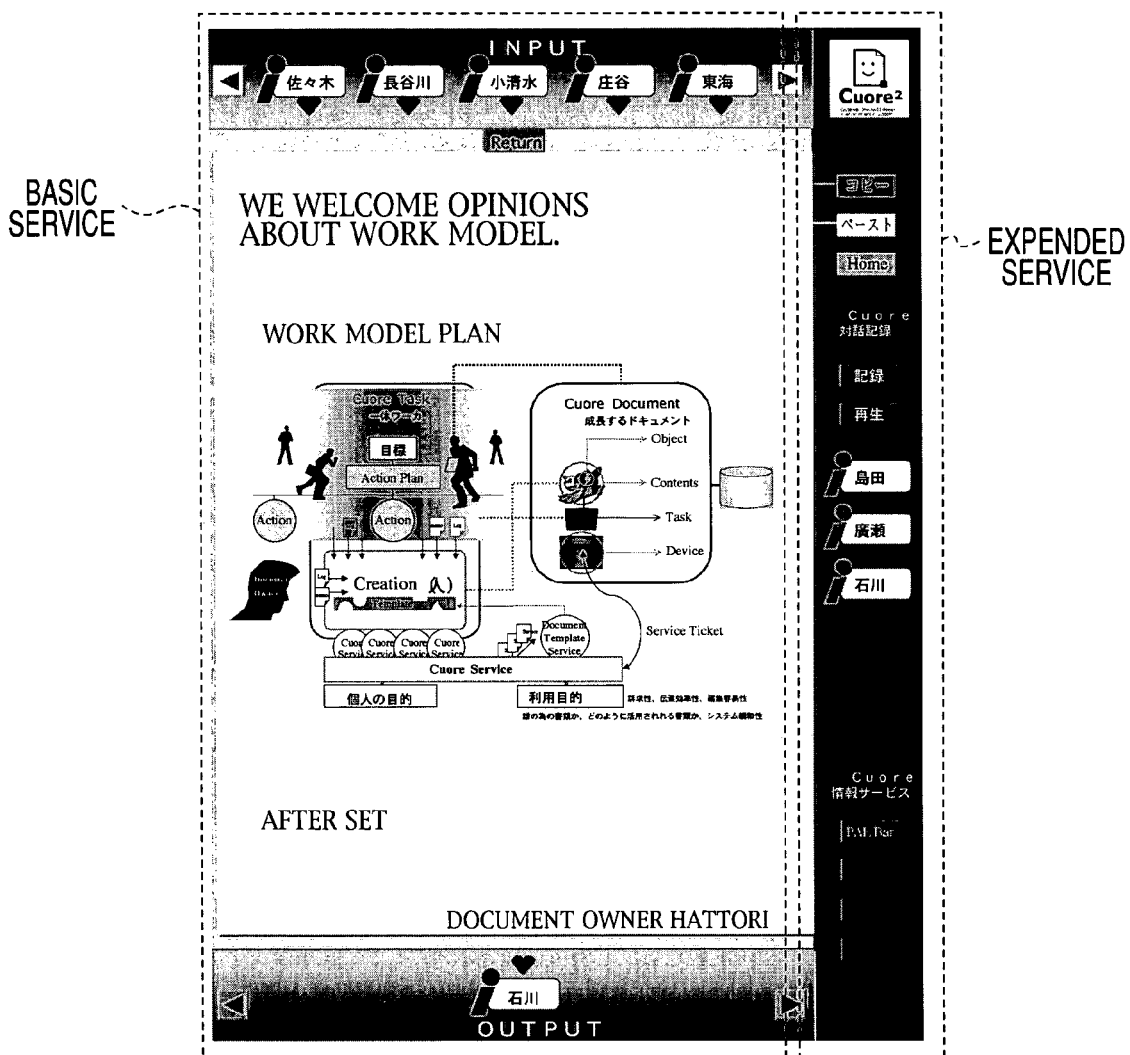
FIG. 8 is a drawing that illustrates an example of display of an information processing terminal according to the exemplary embodiment of the invention.

FIG. 8 illustrates a specific display example of the UI of the information processing unit T. The UI is made up of a basic service part and an expanded service part; the document content display area, the provider display area, and the service receiver display area described above are placed in the basic service part, and the buttons 1 and 2 are placed in the expanded service part. Further, buttons of various functions are provided in the expanded service part for improving the convenience of the information processing unit T.

Next, any other electronic paper EP that can be used will be discussed.

FIG. 11 illustrates another example of the self-write type electronic paper EP.

The electronic paper EP in the figure is also electronic paper for storing an image according to the method previously described with FIGS. 9 and 10; it differs from the electronic paper EP in FIGS. 9 and 10 in that the electronic paper EP has an image rewrite function rather than rewrite of an image under the control of the image write section 8.

Figure 11A:
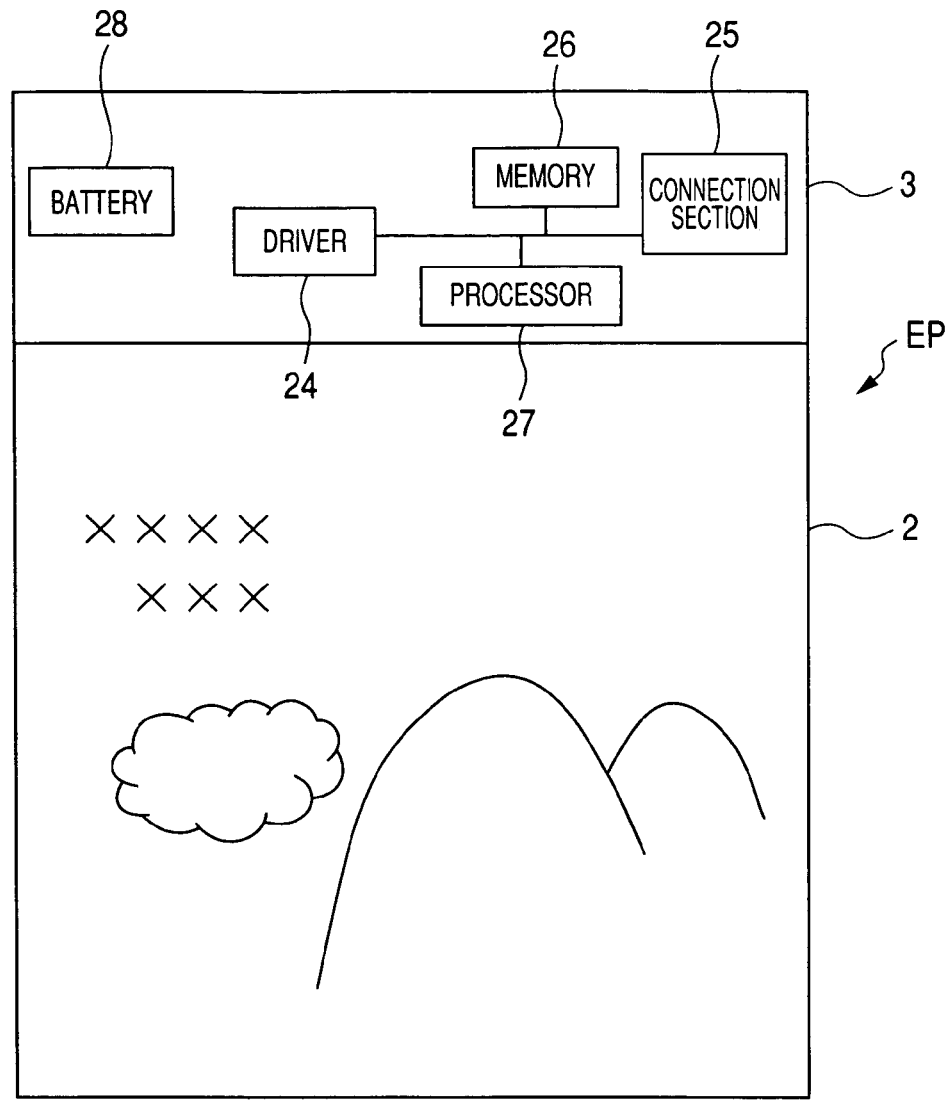
FIGS. 11A and 11B are drawings that illustrate an example of self-write type electronic paper.
Figure 11B:
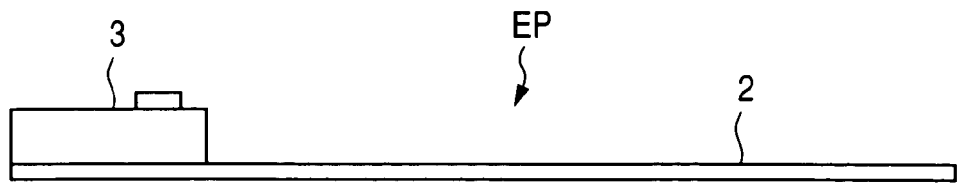

FIG. 11A is a front view of the self-write type electronic paper EP and FIG. 11B is a side view of the self-write type electronic paper EP. The electronic paper EP illustrated in the figure has an image holding section 2 for holding display of an image and a data processing section 3 for performing processing of electronic data; FIG. 11A also illustrates the functional parts contained in the data processing section 3.

The self-write type electronic paper EP is a flexible thin medium of a size like a card stipulated in the JIS or A4 paper and the data processing section 3 is provided on a side of the image holding section 2 occupying the most area. The size of the image holding section 2 is set in response to the use. The image holding section 2 and the data processing section 3 may be made detachable and, for example, the data processing section 3 of clip form may be attached to the image holding section 2 for connection, thereby forming the electronic paper EP.

The data processing section 3 is provided with a driver 24 for driving the image holding section 2 as described later, a connection section 25 for connecting to the information processing unit T, memory 26 for retaining electronic data readably and writably, a processor 27 for performing processing of electronic data, and a battery 28 for supplying operation power to the function means such as the processor 27. A wireless section for conducting wireless communications with the information processing unit T may be provided in place of the connection section 25.

The self-write type electronic paper EP receives the image data of a display document and the access key corresponding to the document from the information processing unit T to which the self-write type electronic paper EP is linked, and retains the image data and the access key in the memory 26. The driver 24 can be driven under the control of the processor 27 for rewrite display of the image whose display is held on the image holding section 2 based on the image data retained in the memory 26. The self-write type electronic paper EP has a function of continuing to hold an image on the image holding section 2 in a display state if the drive power of the driver 24 is removed.

The structure and the operation principle of the image holding section 2 are as previously described with FIGS. 9 and 10 and therefore will not be discussed again.

Next, optical write type electronic paper EP will be discussed with FIGS. 12 to 15 as an example of transfer write type electronic paper.

Figure 12A:
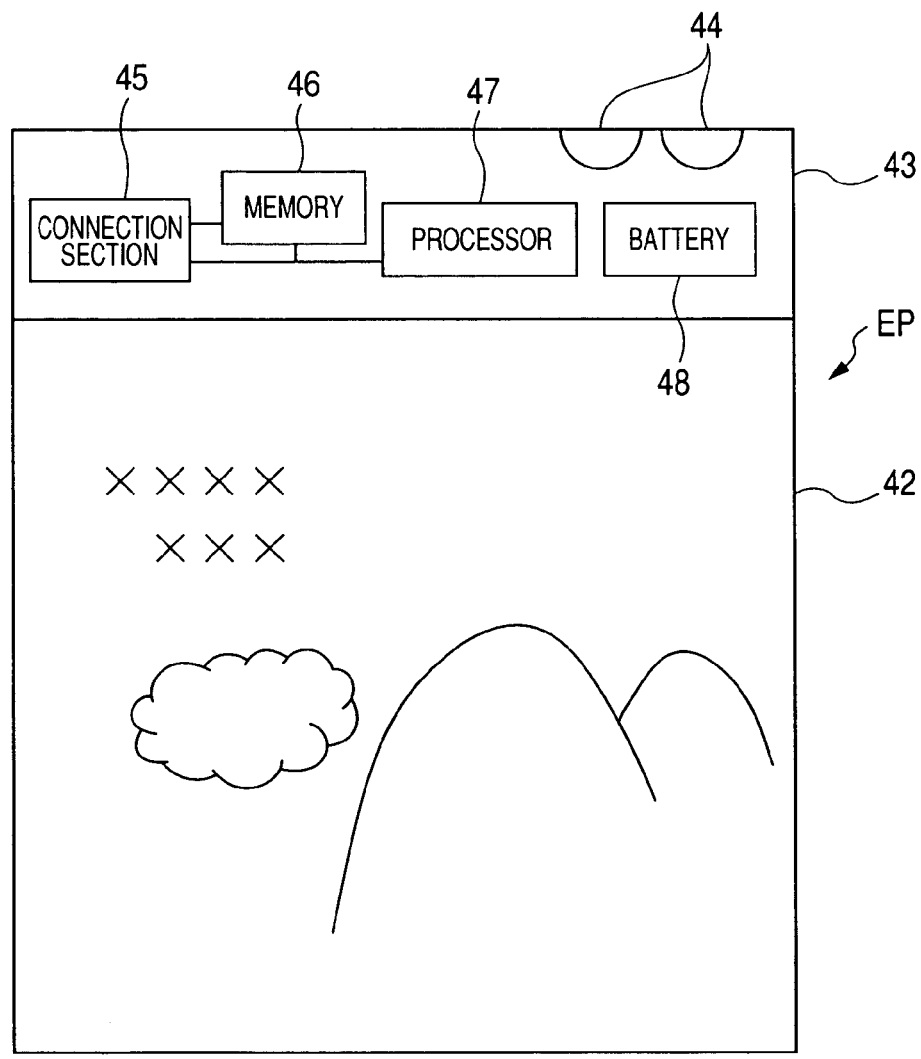
FIGS. 12A and 12B are drawing that illustrate an example of transfer write type electronic paper.
Figure 12B:
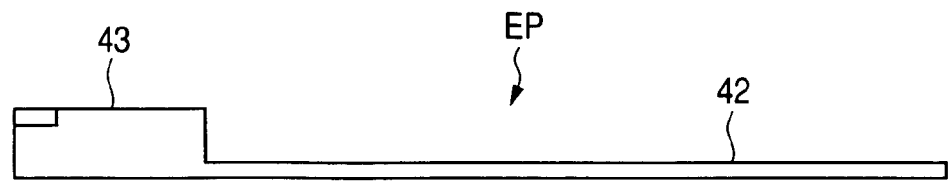

FIG. 12A is a front view of the optical write type electronic paper EP and FIG. 12B is a side view of the optical write type electronic paper EP. The electronic paper EP illustrated in the figure has an image holding section 42 for holding display of an image in a no-power supply state and a data processing section 43 for performing processing of electronic data; FIG. 12A also illustrates the functional parts contained in the data processing section 43.

The optical write type electronic paper EP is a flexible thin medium of a size like a card stipulated in the JIS or A4 paper and the data processing section 43 is provided on a side of the image holding section 42 occupying the most area. The size of the image holding section 42 is set in response to the use.

The data processing section 43 is provided with write electrodes 44 for applying a voltage for driving the display 42 as described later, a connection section 45 for connecting to the information processing unit T, memory 46 for retaining electronic data readably and writably, a processor 47 for performing processing of access to the memory 46, etc., and a battery 48 for supplying drive power to the processor 47, etc.

The optical write type electronic paper EP receives the access key corresponding to the image data of a display document from the information processing unit T to which the optical write type electronic paper EP is linked, and retains the access key in the memory 46. In the example illustrated in the figure, the data processing section 43 having a comparatively high data processing function is illustrated, but known RFID including a wireless communication function of data and a data storage function in a comparatively simple configuration may be used as the data processing section 43.

Figure 13:
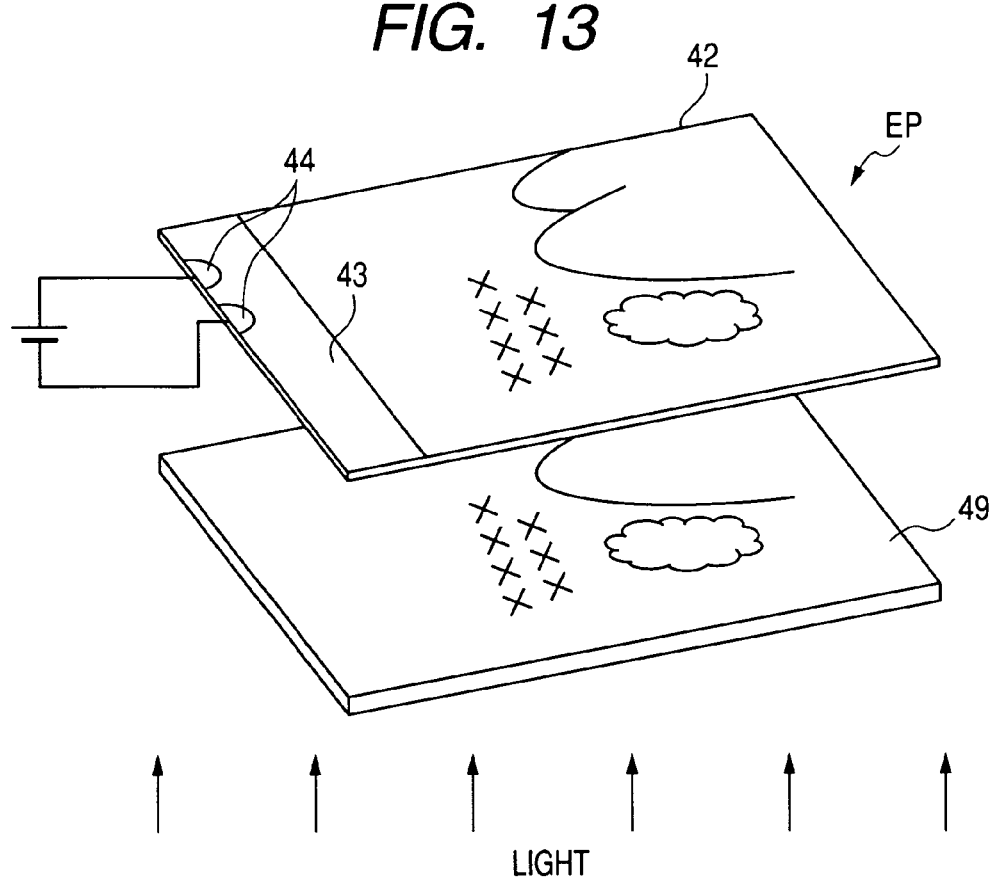
FIG. 13 is a drawing that illustrates a use method of transfer write type electronic paper.

For example, as illustrated in FIG. 13, an image to be written is displayed on a liquid crystal panel 49 and while the voltage from an external power supply is applied to the electrode 44, the optical write type electronic paper EP is put on the liquid crystal panel 49 and light is applied, whereby the image displayed on the liquid crystal panel 49 can be transferred to the image holding section 42 for storage. In short, the optical write type electronic paper EP has a function of transferring the projected image to the image holding section 42 as voltage is applied to the electrode 44 and continuing to hold the image in a display state still after the voltage applied to the electrode 44 is removed.

To use such optical write type electronic paper EP, the information processing unit T includes means required for optical write, such as a voltage application section to the electrode 44, the liquid crystal panel 49, and a light application section.

Figure 15:
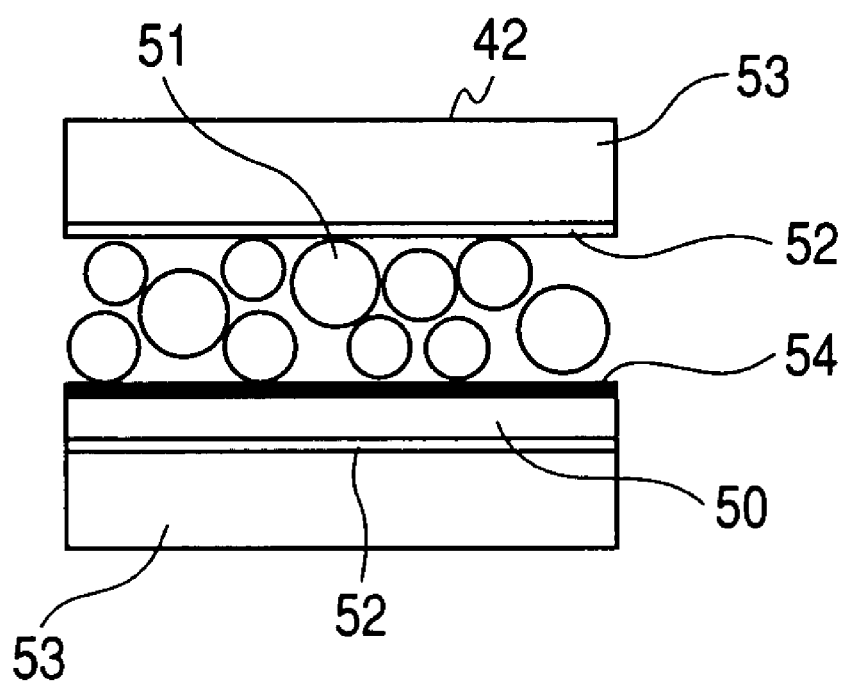
FIG. 15 is a drawing that illustrates the structure of transfer write type electronic paper.

The optical write type electronic paper EP has a structure wherein a layer of organic photoconductive material (organic photoconductive layer) 50 used with a copier and a layer of liquid crystal display material (cholesteric liquid crystal layer put into microcapsules) 51 are used in combination and these layers are sandwiched between a pair of surface and back transparent electrodes 52 and the layered body is sandwiched between a pair of surface and back transparent substrate films 53, as illustrated in FIG. 15 representing the cross-sectional structure of the image holding section 42. In the structure, monochrome image display can be produced with white display provided by the cholesteric liquid crystal layer 51 reflecting light and black display as light passes through the liquid crystal layer 51 and is absorbed in a black layer 54 provided between the cholesteric liquid crystal layer 51 and the organic photoconductive layer 50. Further, since the cholesteric liquid crystal has a characteristic of interference reflecting of color light responsive to helical pitches, the cholesteric liquid crystal layer 51 is formed by depositing liquid crystal materials different in helical pitch, so that it is also possible to realize color display as a simple structure.

Figure 14:
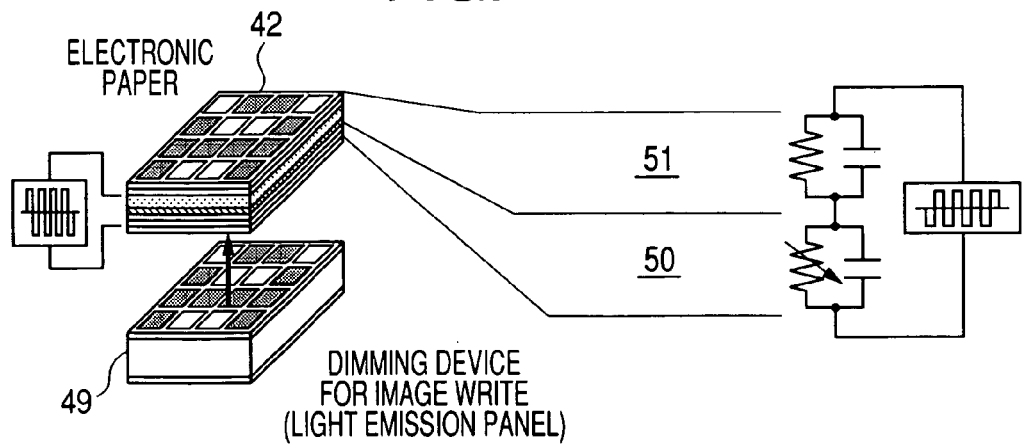
FIG. 14 is a drawing that illustrates the operation principle of transfer write type electronic paper.

For example, an image to be transferred to the dimming device panel for image write (light emission panel) 49 is displayed on the optical write type electronic paper EP and is projected on the image holding section 42 and when a voltage is applied to the electrode 44, intensity of light is converted into the reflection density in a moment and the projection image is retained, as illustrated in FIG. 14 representing the operation principle of the image holding section 42. An erasion voltage is applied to the electrode 44, whereby the image information retained in the image holding section 42 can be erased and the optical write type electronic paper EP can be used repeatedly as write and erasion are repeated. Without performing such erasion processing for the optical write type electronic paper EP, a voltage is applied to the electrode 44 and a new image is projected as described above, whereby the image information retained in the image holding section 42 can also be overwritten with new information; the optical write type electronic paper EP can be used repeatedly as such overwrite processing is performed.

As another example of the transfer write type electronic paper EP, the image holding section 42 may have a thermal transfer structure as known and an image may be thermally transferred to the image holding section 42 by a terminal transfer section included in an electronic paper printer for holding display.

In the document processing system of the exemplary embodiment, the information processing unit T includes the image write function to electronic paper EP and the access key write function, but an electronic paper printer may be provided additionally.

As illustrated in FIG. 1, a desktop personal computer (PC) may be provided with an access key read function from electronic paper EP to form the information processing unit T or a mobile information terminal such as a mobile personal computer or a PDA may be provided with an access key read function from electronic paper EP to form the information processing unit T.

In the document processing system of the exemplary embodiment, the document management DB 15 included in the document management server S is accessed through the document access section 16, but may be directly accessed by each information processing unit T.

What is claimed is:

1. A document processing system comprising:
 a document management server that manages document data and an access key to access the document data managed in association with each other, the access key including at least a document ID for identifying the document data; and
 an information processing unit comprising:
  a processing section; and
  a removable display, detachably linked to the processing section by one of a wired and a wireless connection, the removable display displaying an image of a document corresponding to the document data and the removable display storing the access key to access the document data,
  the processing section comprising:
   a connection section to which the removable display is linked so as to read the access key from the removable display when the removable display is connected to or placed in close proximity to the processing section;
   a document acquisition section that acquires the document data, corresponding to the access key read from the removable display, from the document management server, and adds a user ID of a user operating the information processing unit to the access key; and
   a document processing section that processes the document data acquired from the document management server; and
  an access log management unit that stores an access log associating the document ID of the access key and the user ID added to the access key with each other as the processing section acquires the document data based on the access key from the document management server,
  wherein when the user receives the removable display from another user and connects the removable display to the processing section, the document acquisition section acquires the document data from the document management server, the document data having been previously displayed to another user on the removable display, and
  wherein the removable display is an electronic paper capable of holding an image in a no-power supply state or the removable display is a transfer type write type electronic paper.

2. The document processing system of claim 1, wherein the access log management unit stores the document data and the processing section with each other as the processing section acquires the document data based on the access key from the document management server.

3. The document processing system of claim 1, further comprising:
 a use log management unit that stores a use log associating the document data with a different document data created by using the document data,
 wherein the removable display holds the image of the document with an image indicating a relationship between the different document and the document based on the use log corresponding to the document.

4. An information processing unit comprising:
 a processing section; and
 a removable display that is detachably linked to the processing section by one of a wired and a wireless connection, that displays an image of a document corresponding to a document data and stores an access key to access the document data, the access key including at least a document ID for identifying the document data,
 the processing section comprising:
  a connection section to which the removable display is linked for reading the access key from the removable display when the removable display is connected to or placed in close proximity to the processing section;
  a document acquisition section that acquires the document data based on the access key read from the removable display, the document data being managed in association with the access key in a document management server, and adds a user ID of a user operating the information processing unit to the access key; and
  a document processing section that processes the document data acquired from the document management server, wherein
 when the user receives the removable display from another user and connects the removable display to the processing section, the document acquisition section acquires the document data from the document management server, the document data having been previously displayed to another user on the removable display, and an access log management unit stores an access log associating the document ID of the access key and the user ID added to the access key with each other as the processing section acquires the document data based on the access key from the document management server, and wherein the removable display is an electronic paper capable of holding an image in a no-power supply state or the removable display is a transfer type write type electronic paper.

5. A removable display medium comprising:

a memory, the removable display detachably linked to a processing section by one of a wired and a wireless connection and displaying of an image of a document so as to acquire document data from a document management server and process the document data, the document management server managing the document data and an access key for access to the document data in association with each other, the removable display medium storing the access key to access the document data in the memory, the access key including at least a document ID for identifying the document data, the access key being read from the removable display medium when it is connected to or placed in close proximity to the processing section, wherein when a user receives the removable display from another user and connects the removable display to the processing section, the removable display acquires the document data from the document management server, the document data having been previously displayed to another user on the removable display, the processing section adds a user ID of the user operating the information processing unit to the access key, and an access log management unit stores an access log associating the document ID of the access key and the user ID added to the access key with each other as the processing section acquires the document data based on the access key from the document management server, and wherein the removable display is an electronic paper capable of holding an image in a no-power supply state or the removable display is a transfer type write type electronic paper.

6. A computer readable medium storing a program causing a computer to execute a process for serving as a processing section of an information processing unit so as to acquire document data from a document management server and process the document data, the information processing unit comprising:

a removable display detachably linked to the processing section by one of a wired and a wireless connection, the removable display displaying an image of a document corresponding to the document data and the removable display storing an access key to access the document data, the access key including at least a document ID for identifying the document data, the process comprising:

reading the access key from the removable display that is linked to the processing section by one of the wired and the wireless connection when the removable display is connected to or placed in close proximity to the processing section, acquiring the document data based on the access key, the document data being managed in association with the access key in the document management server, adding a user ID of a user operating the information processing unit to the access key, processing the document data that is acquired from the document management server, and storing an access log associating the document ID of the access key and the user ID added to the access key with each other as the document data is acquired based on the access key from the document management server, wherein a when user receives the removable display from another user and connects the removable display to the processing section, the acquiring includes acquiring the document data from the document management server, the document data having been previously displayed to another user on the removable display, and wherein the removable display is an electronic paper capable of holding an image in a no-power supply state or the removable display is a transfer type write type electronic paper.

7. A document processing method executed by a document processing system comprising:

a document management server that manages document data and an access key to access the document data in association with each other; and an information processing unit comprising:

a processing section; and a removable display detachably linked to the processing section by one of a wired and a wireless connection, the removable display holding an image of a document corresponding to the document data and the removable display storing the access key, the access key including at least a document ID for identifying the document data, the document processing method comprising:

reading the access key from the removable display linked to the processing section by one of the wired and the wireless connection when the removable display is connected to or placed in close proximity to the processing section;

acquiring the document data corresponding to the access key from the document management server;

adding a user ID of a user operating the information processing unit to the access key;

processing the document data acquired from the document management server; and storing an access log associating the document ID of the access key and the user ID added to the access key with each other as the document data is acquired based on the access key from the document management server, wherein when a user receives the removable display from another user and connects the removable display to the processing section, the acquiring includes acquiring the document data from the document management server, the document data having been previously displayed to another user on the removable display, and wherein the removable display is an electronic paper capable of holding an image in a no-power supply state or the removable display is a transfer type write type electronic paper.

8. The document processing system of claim 1, wherein the removable display is a self-write type electronic paper.

9. The information processing unit of claim 4, wherein the removable display is a self-write type electronic paper.

10. The removable display medium of claim 5, wherein the removable display medium is a self-write type electronic paper.

11. The computer readable medium of claim 6, wherein the removable display medium is a self-write type electronic paper.

12. The document processing method of claim 7, where in the removable display is a self-write type electronic paper.

13. The document processing system of claim 1, wherein the access key further includes permission information indicating permitted processing.

14. The information processing unit of claim 4, wherein the access key further includes permission information indicating permitted processing.

15. The removable display medium of claim 5, wherein the access key further includes permission information indicating permitted processing.

16. The computer readable medium of claim 6, wherein the access key further includes permission information indicating permitted processing.

17. The document processing method of claim 7, wherein the access further includes permission information indicating permitted processing.

18. The document processing system of claim 1, wherein when the document acquisition section acquires the document data from the document management server and when the document data contains two or more page, but all of the pages are not displayed on the removable display, the document processing section processes the document data so that all of the pages can be read.

19. The information processing unit of claim 4, wherein when the document acquisition section acquires the document data from the document management server and when the document data contains two or more page, but all of the pages are not displayed on the removable display, the document processing section processes the document data so that all of the pages can be read.

20. The removable display medium of claim 5, wherein when the document data is acquired from the document management server and when the document data contains two or more page, but all of the pages are not displayed on the removable display, the document processing section processes the document data so that all of the pages can be read.

* * * * *